INVENTOR.
CARL D. MILLER
BY
Jerome R. Cox
ATTORNEY

July 17, 1962  C. D. MILLER  3,044,677
INTERMITTENT FILM TRANSPORT MECHANISM
Filed June 13, 1958  5 Sheets-Sheet 4

INVENTOR.
CARL D. MILLER
BY
Jerome R. Cox
ATTORNEY

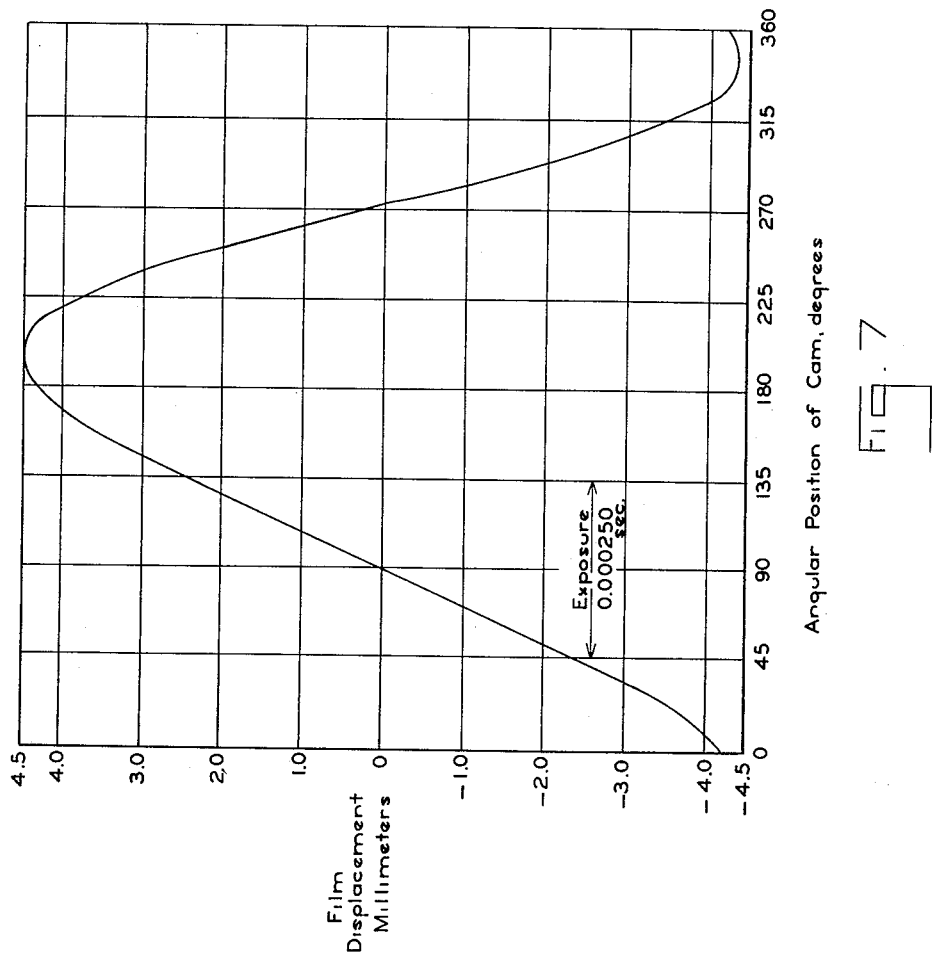

United States Patent Office 3,044,677
Patented July 17, 1962

3,044,677
INTERMITTENT FILM TRANSPORT MECHANISM
Carl David Miller, Columbus, Ohio
(4546 Rhode Island St., San Diego 16, Calif.)
Filed June 13, 1958, Ser. No. 741,964
7 Claims. (Cl. 226—117)

The inventions disclosed and claimed in this application relate to improvements in high speed cameras. Specifically, the embodiments of the invention disclosed herein in illustration of the inventions consist of cameras each comprising at least in part an exposure gate, a lens for focusing an image on a portion of a film when positioned adjacent to said exposure gate, and a shutter for interrupting the passage of light rays forming said image from said lens to said film (all of which are fairly conventional in cameras) in combination with new means for moving the portion of the film which is next to be exposed quickly to a position at said exposure gate while the shutter is closed, holding said portion of the film stationary at said exposure gate while the shutter is open and then after said portion of the film has been exposed, moving it quickly from said position at the exposure gate while the shutter is again closed.

While my inventions are applicable to cameras having film movable at various speeds, it was specifically designed for use with a motion picture camera operating with standard 35 mm. film at speeds up to 1000 frames per second, with a quality of image resolution comparable to cameras now designed to operate at 24 frames per second. The problem of moving a film quickly into a definite position, stopping it at the position in which an image may be focused on a portion of the film, opening a shutter at that precise instant so that the image is recorded on the light-sensitive film in that instant, and then closing the shutter and moving the film quickly from the position and moving another frame to said position, is magnified as the speed of operation of the camera increases. The forces acting on the film strip itself, to accelerate and decelerate the film strip as is necessary in the space of 1/1000 of a second, build up to a point at which it is very difficult to operate without breakage, shearing or tearing of the film strip.

Objects

One object of my invention therefore is the provision of mechanism in cameras by which a film strip may be (1) fed at high speed from a constant rate supply past an exposure gate of a camera to a constant rate take up; (2) decelerated to a stationary condition with a specified frame at a position adjacent said exposure gate; (3) held at such stationary position for the time necessary to record the image upon the film; and (4) then quickly moved away from said exposure gate so that a new frame may be positioned at the exposure gate to be in turn exposed to a successive image at a rate of exposure of up to 1000 frames per second.

A further object of my invention is the provision in such cameras of an apparatus for quickly decelerating and accelerating the specified portion of the film, utilizing the displacement of an ellipse rotating about a center which is eccentric of the geographical center of the ellipse (i.e. eccentric to the center of gravity of the ellipse).

A further object of my invenion is the utilization in such an apparatus of cam means for producing intermitment motion of a film strip in a high speed camera, the cam means being based upon the principle that the graph of a combination of a fundamental sine curve with its second harmonic produces a line which has a substantially constant slope over approximately ¼ of a cycle, provided the fundamental and second harmonic are properly phased relative to each other and have proper amplitude relative to each other.

A further object of my invention is the provision in a high speed camera of means for feeding a film strip at a substantially constant speed toward an exposure gate, means for taking up the film strip at the same constant speed, and means intermediate said feeding means and said take up means for in effect increasing the length of the loop of the film strip between the supply reel and the exposure gate at the same rate that the film is being fed forward by said supply means during a part (approximately 25%) of the cycle and at the same time decreasing the length of the loop between the exposure gate and the take up reel at the same rate so that during said period the portion of the film at the exposure gate remains stationary.

Further objects and features of the invention will be apparent from the subjoined specification and claims when considered in connection with the accompanying drawings.

Drawings

I have illustrated embodiments of my invention in the accompanying drawings wherein:

FIG. 5 is a view in elevation of a clamping mechanism for holding the film stationary at the exposure gate during the exposure interval;

FIG. 6 is a fragmentary view in elevation showing the clamping mechanism of FIG. 5 looking at it in a direction at right angles to the view of FIG. 5; and FIG. 7 is a diagram similar to FIG. 3 illustrating the corresponding relationships in the operation of the structure of FIG. 2.

Detailed Description

Figure 1:
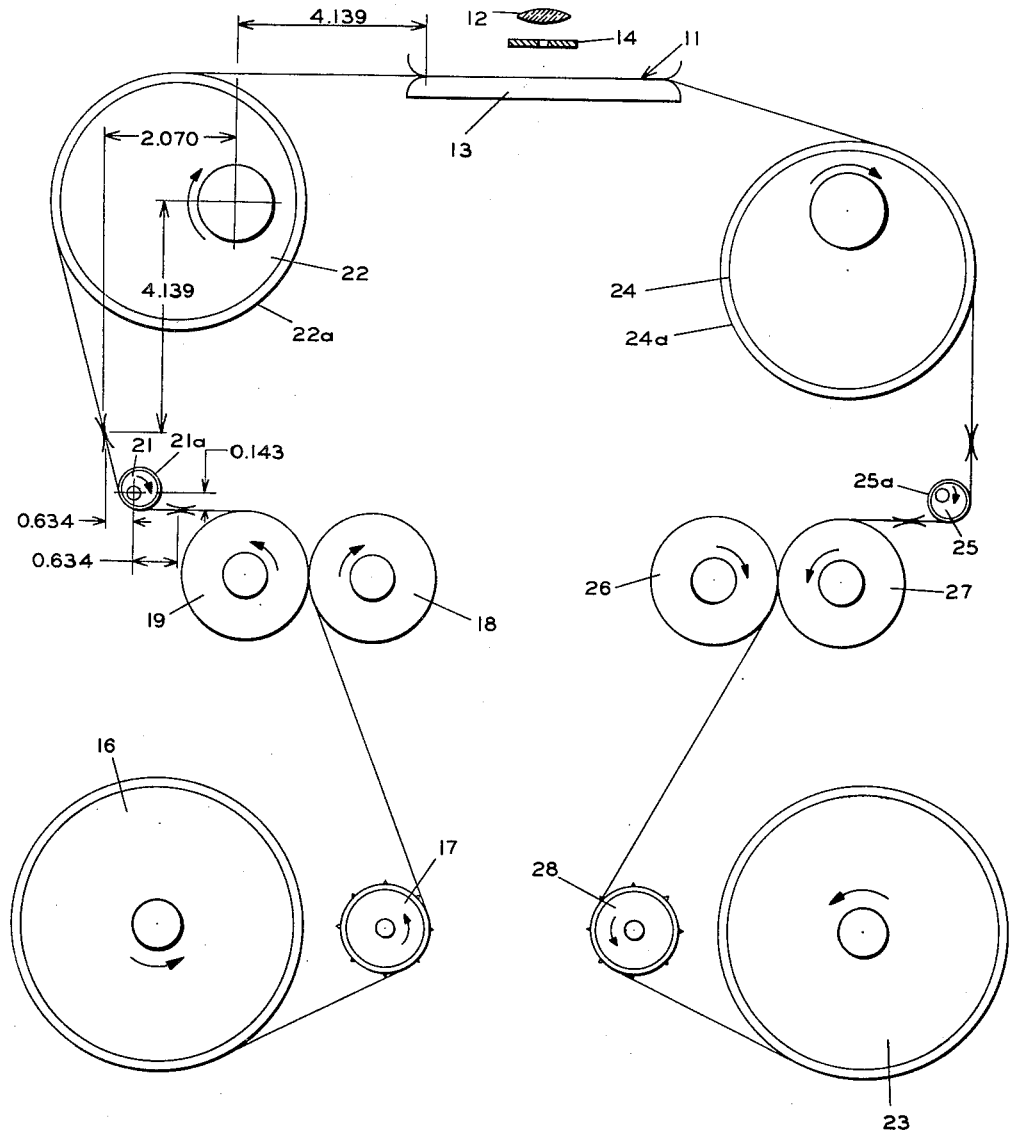
FIG. 1 is a diagrammatic view showing a camera embodying my invention and including a lens, an exposure gate, and a shutter and having an eccentric operated mechanism consisting of four eccentrics for variable speed film transport.

In aerial cameras now in use, a high speed reciprocating platen has heretofore been provided together with suction means for holding the film format against the platen during exposure. These devices have the difficulty inherent in the high reciprocating forces involved in moving the platen back and forth at such high speeds. I have found that a point by point addition of the displacements corresponding to two simple harmonic motions (if these two motions are selected as described below) will produce a substantially constant velocity through a time interval equal to 25% of the repetitive cycle. For this purpose the displacement amplitude of one of the component simple harmonic motions must be approximately 7¼ (that is 7.249+) times as great as the displacement amplitude of the other, and that the frequency of the simple harmonic motion of the smaller amplitude must be axactly twice the frequency of the simple harmonic motion of the greater amplitude. I conceived the idea of imparting a constant linear rate or speed to the supply and take up of a strip of film used and at the same time in effect imparting to the loop of the film intermediate the supply and take up, a motion corresponding to two such simple harmonic motions without involving reciprocating movement of any mechanical part other than the film so that the movement of the loop in one direction during approximately 25% of the cycle equals the movement of the film from the supply to the take up in the opposite direction and thus during such period holds the film stationary at the exposure gate. It is obvious that during another part of the cycle (approximately 25% thereof) the movement of the loop is added to the movement of the film so that the film during such part of the cycle is moving linearly at the exposure gate at a speed of approximately twice the speed of the supply and take up thereof. During the intervals of the cycle intermediate the period when the film is stationary at the exposure gate and is moving at double speed, the film is accelerating to double speed and is decelerating to a stationary condition. To accomplish this motion it is obvious that I vary the length of the film between the locations in a cyclic manner.

To explain the operation in a slightly different way, such a motion involves the feeding of film from the supply roll and the feeding of the film to the take up spool, at a constant linear rate. A mechanism is then provided between the supply roll and the area of exposure which varies the length of the film between those locations in a cyclic manner. A similar mechanism is located bteween the area of exposure and the take up roll, and provides the same type of variation of length of film between these two positions, 180° out of phase with the variation produced between the supply roll and the exposure area.

The variation of the length of the film is made by both mechanisms in accordance with the combination of two simple harmonic motions. With such an arrangement the motion of the film in the exposure area is composed of three components: (1) a constant linear velocity throughout the entire cycle of operation; (2) a simple harmonic motion of suitable amplitude and a frequency equal to the number of frames to be exposed per second; and (3) a second simple harmonic motion of displacement amplitude equal to approximately 13.8% of the displacement amplitude of the basic harmonic motion and of exactly twice the frequency. The motion consisting of the three components listed permits better resolution than 20 lines per millimeter, with a perfect lens even without the clamping mechanism illustrated in FIGS. 2, 5 and 6.

*First Embodiment*

FIGURE 1 is an illustration of one arrangement that I evolved to produce the desired variation of film speed at the exposure gate without the use of reciprocating parts. The device uses two pairs of circular eccentrics (i.e. a pair of larger eccentrics and a pair of smaller eccentrics) over each of which the film turns through approximately a 90° arc. One eccentric of each pair is located between the supply roll and the exposure gate and the other eccentric of each pair is located between the exposure gate and the take up roll. The two larger eccentrics rotate through one revolution for each frame exposed; the smaller eccentrics rotate through two revolutions for each frame.

Each of the four eccentrics produces approximately a simple harmonic variation in length of film on the opposite sides of the exposure gate. I have found that the combined effect of the four eccentric produces an adequate approximation of the desired motion at the exposure gate, and produces negligible stretching or slackening of the film.

Referring still particlarly to FIG. 1 of the drawings, it may be seen that I have shown therein a camera 11. This camera includes a lens 12 or directing an image towards an exposure gate 13. It also includes a shutter 14 for periodically interrupting the passage of the image along the path between the lens 12 and the gate 13. I also provide means for causing a film strip to pass adjacent to said exposure gate. This means includes the supply reel 16 and a sprocket wheel 17 and rollers 18 and 19 for moving the film strip from said supply reel 16 at a constant rate. It also includes cams 21 and 22 for imparting a variation of the movement of the film strip from the constant rate maintained by the rollers 18 and 19. I provide the cam 21 for modifying the movement of the film from the supply reel and I provide cam 22 for further modifying the movement of the film from the supply reel. Both of the cams 21 and 22 are interposed between the rollers 18 and 19 and the exposure gate 13. The cam 21 rotates at twice the speed of the cam 22 so that if the cam 22 is rotated at a rate of 60,000 revolutions per minute, the cam 21 is rotating at a rate of 120,000 rotations per minute. Between the exposure gate 13 and the film take up roll 23 I have interposed a cam 24 corresponding in size to the cam 22, a cam 25 corresponding in size to the cam 21, constant rate take up rollers 26 and 27 corresponding to the rollers 18 and 19, and sprocket wheel 28 corresponding to sprocket wheel 17.

FIG. 1 thus illustrates an intermittent film transport mechanism which employs two pairs of circular eccentrics (one pair being large eccentrics and the other pair being small eccentrics) all located in contact with the photosensitive film. The film slides freely around part of the circumference of each eccentric, on circular sleeves 21a, 22a, 24a and 25a provided around each cam as shown. One eccentric of each pair is placed between the mechanism supplying the film at a steady rate (i.e. 16, 17, 18 and 19) and the exposure gate 13. The other eccentric of each pair is placed between the exposure gate 13 and the mechanism taking up the film at a steady rate (i.e. 23, 26, 27 and 28). The function of the two eccentrics before the exposure gate is to vary the total length of film between the exposure gate and the constant rate supply approximately as two sine functions (i.e. a fundamental and a second harmonic). The two eccentrics beyond the exposure gate vary the length of film between the exposure gate and the constant rate take up in the same manner. The eccentrics would be so phased (i.e. 180° apart) that the total length of film from the point of constant rate supply to the point of constant rate take up would remain substantially unchanged throughout the cycle of operation.

The period of the fundamental sine function is equal to the period between successive image exposures, and the amplitude of the function and of the second harmonic is such that the film remains virtually stationary at the exposure gate throughout the exposure interval. Hence, with camera operating at a thousand frames per second, the speed of each slower larger eccentric is 60,000 r.p.m. The second and smaller pair of eccentrics operate at twice this speed (i.e. 120,000 r.p.m.).

Because the eccentrics vary the length of film between the constant rate supply mechanism and the exposure gate approximately as two sine functions, I analyzed the combination of two such sine waves. I found that the image resolution would be satisfactory if the sine functions followed the equation $D=0.1639 \sin \omega t + 0.02261 \sin (2\omega t + 180°)$, where D is film displacement in inches and $\omega$ is any desired angular velocity in radians per second and $t$ is the time in seconds from an arbitrary datum instant of time.

*Second Embodiment*

Figure 2:
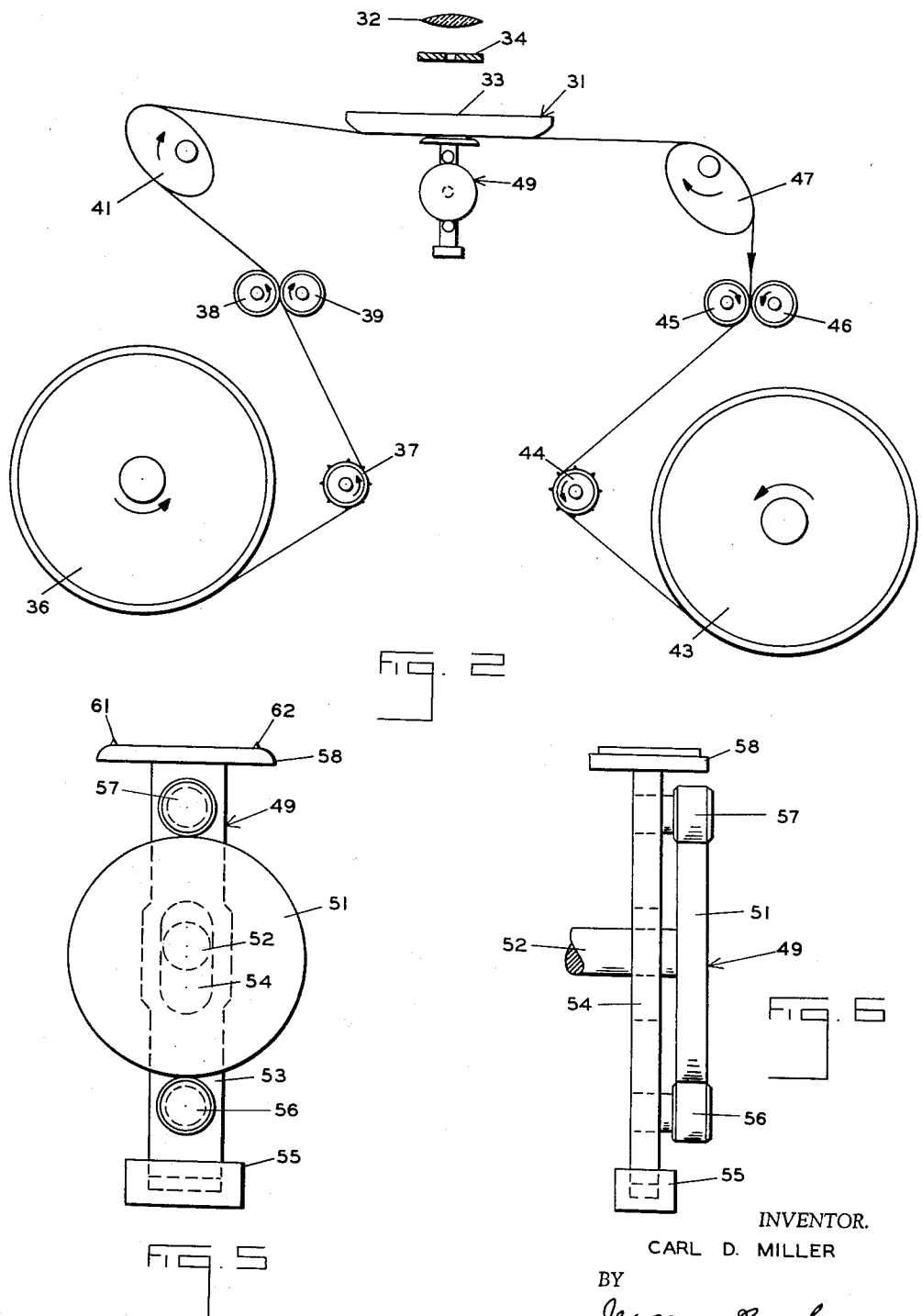
FIG. 2 is a diagrammatic view of a camera embodying my invention and having an intermittent film transport mechanism using a single pair of elliptical eccentrics in contact with the film, in combination with a lens, a clamp and a shutter.

FIG. 2 shows the arrangement of a pair of elliptical eccentrics each rotated at 60,000 r.p.m. Some of the advantages of this arrangement over the system using two pairs of circular eccentrics are the simplification of the mechanism, the elimination of the 120,000 r.p.m. eccentrics, and the reduction of the length of the film to be accelerated. Thus FIG. 2 illustrates a high speed camera having the essential components of a preferred mechanism to produce the required intermittent film motion and having a clamp 49 for holding the film stationary at the exposure gate. The camera 31 illustrated therein includes a lens 32 for directing an image towards an exposure gate 33. It also includes a shutter 34 for interrupting the passage of the light rays forming the image along the path between the lens 32 and the gate 33. The means for supplying film and for producing the required intermittent motion thereof includes the supply reel 36 and a sprocket wheel 37, and rollers 38 and 39 for moving the film strip from said supply roll 36 at a constant rate. The means also includes an elliptical eccentric cam 41 interposed between the supply reel 36 and the gate 33 for periodically increasing and decreasing the length of the loop of film between said reel 36 and gate 33. A means for keeping the film taut and taking up the exposed film is also provided. It includes a film take up reel 43, a sprocket wheel 44, constant speed take up rollers 45 and 46 and an elliptical eccentric cam 47 (corresponding to cam 41) the cam 47 being provided for periodically decreasing and increasing the length of the loop of film between the gate 33 and the reel 43. A clamping mechanism 49 (hereafter described more in detail) is provided for holding the film absolutely stationary while the shutter 34 is open. The components of the mechanism for producing intermittent film motion include (1) means for supplying film at a constant rate; (2) means for keeping the film taut and taking it up after exposure; (3) a single pair of elliptical eccentric cams (41 and 47) proportioned to produce the film motion required from the standpoint of film resolution; (4) a clamp 49 to hold the film stationary during the exposure intervals; and (5) two pairs of rollers (38 and 39, and 45 and 46) to distribute the stresses due to high acceleration and deceleration in the film across the entire width of the film.

In the prior art devices for providing intermittent movement of photographic film such as motion picture film, it is usually the practice to provide a moving finger or sprocket tooth which is inserted into perforations of the film to stop and start the movement of the film. With the high speed starting and stopping required herein the inertia forces are considerable. In the prior art devices referred to, the load is applied as a crushing force on the perforations of the film. There is a high stress concentration which acts with a shearing force and cuts the film between perforations. My inertia rollers 38, 39, 45 and 46 have a large moment of inertia. They are not driven but run free with the forward movement of the film and maintain the uniform forward movement of the film. They are in close contact with the film across the entire width thereof and thus distribute the stresses which otherwise would be caused by the action of the eccentrics 41 and 47 in stopping and starting the film at the exposure gate 33. The sprocket drives 37 and 44 initially start the film and maintain its constant forward motion and the inertia rollers 38, 39, 45 and 46 are thus accelerated fairly gradually. As soon as the film reaches its operating speed of 1000 frames per second, the inertia rollers 38, 39, 45 and 46 absorb all acceleration and deceleration loads. The sprocket drives 37 and 44 insure that the film runs in absolute phase with the eccentrics so that the distance between successive exposures at the exposure gate will be exactly the correct distance between exposures as related to the film perforations, and so that the exposures at the exposure gate will be properly positioned relative to the perforations.

I initially determined the eccentricity of the elliptical eccentrics as equal to that of the larger eccentrics in the system (FIG. 1) composed of two pairs of circular eccentrics. I initially determined the ellipticity of the eccentrics by adding to the constant diameter of the larger circular eccentrics twice the variation in radius of the smaller eccentrics (FIG. 1), measured from the surface of the eccentric to the center of rotation for each angular position.

FIG. 2 thus illustrates an intermittent film transport mechanism using a single pair of elliptical eccentrics rotating in contact with the photosensitive film. The film slides freely over the circumference of each eccentric. One eccentric is placed between the mechanism supplying film at a steady rate and the exposure gate. The other eccentric is placed between the exposure gate and the mechanism taking up the film at a steady rate.

The function of the eccentric ahead of the exposure gate is to vary the length of the film between the constant rate supply and the exposure gate approximately as the combination of two sine functions, the fundamental and the second harmonic. In the same manner the eccentric beyond the exposure gate varies the length of film between the exposure gate and the constant rate take up. The eccentrics are so phased that the total length of film between the constant rate supply and the constant rate take up remains virtually unchanged throughout the entire cycle of the operation and so that the film remains taut throughout the operation.

Figure 3:
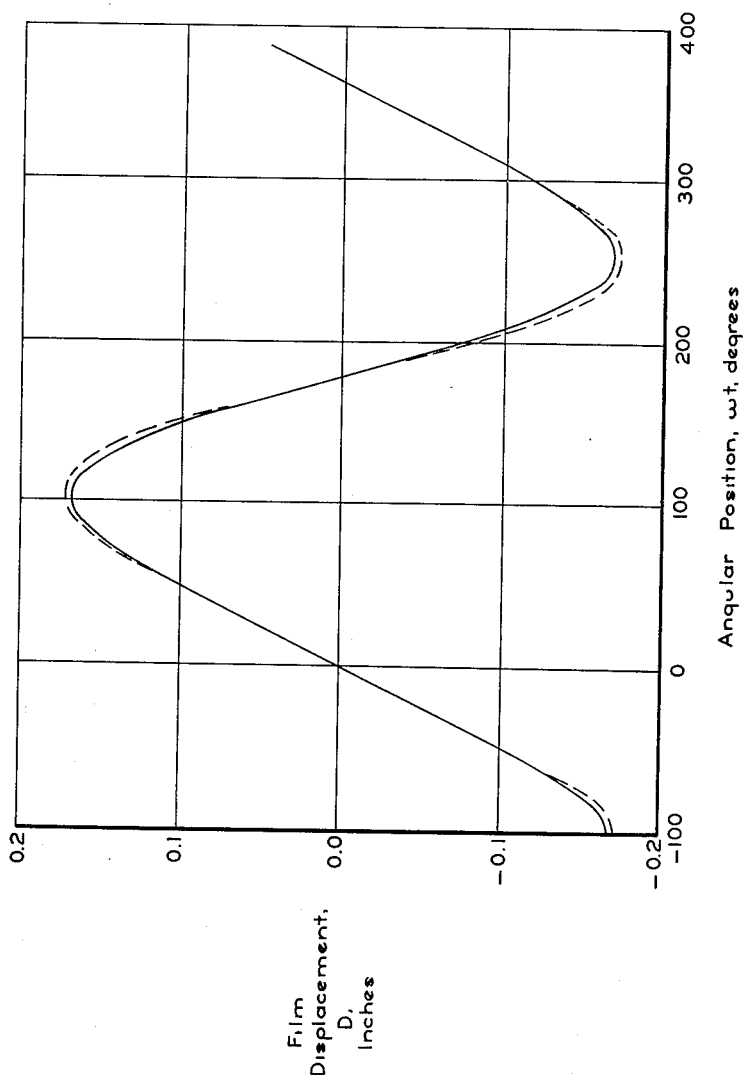
FIG. 3 is a diagram showing the relation between film displacement accomplished by the aforesaid two pairs of circular eccentrics and the computed angular position according to the theoretical equation.

FIG. 3 shows by the solid line, the displacement time diagram for the combination of the two sine functions. The linear portion of the curve between the values of $-45°$ and $+45°$ for $\omega t$ represents the exposure interval.

The ordinates in FIGURE 3 represent the backward displacement of the moving film at the exposure gate due to the operation of the eccentrics. This backward displacement of course is superposed upon the constant forward movement of the film from the supply roll through the entire mechanism to the take up roll. The positive ordinates in FIGURE 3 also represent a lengthening of the film between the supply roll and the exposure gate, or a shortening of the film between the exposure gate and the take up roll. The scale of ordinates in FIGURE 3 is arranged in such a manner that the curve intersects the axis of abscissas at zero degrees, 180 degrees and 360 degrees. The dash line in FIG. 3 shows the displacement produced by two pairs of circular eccentrics.

Figure 4:
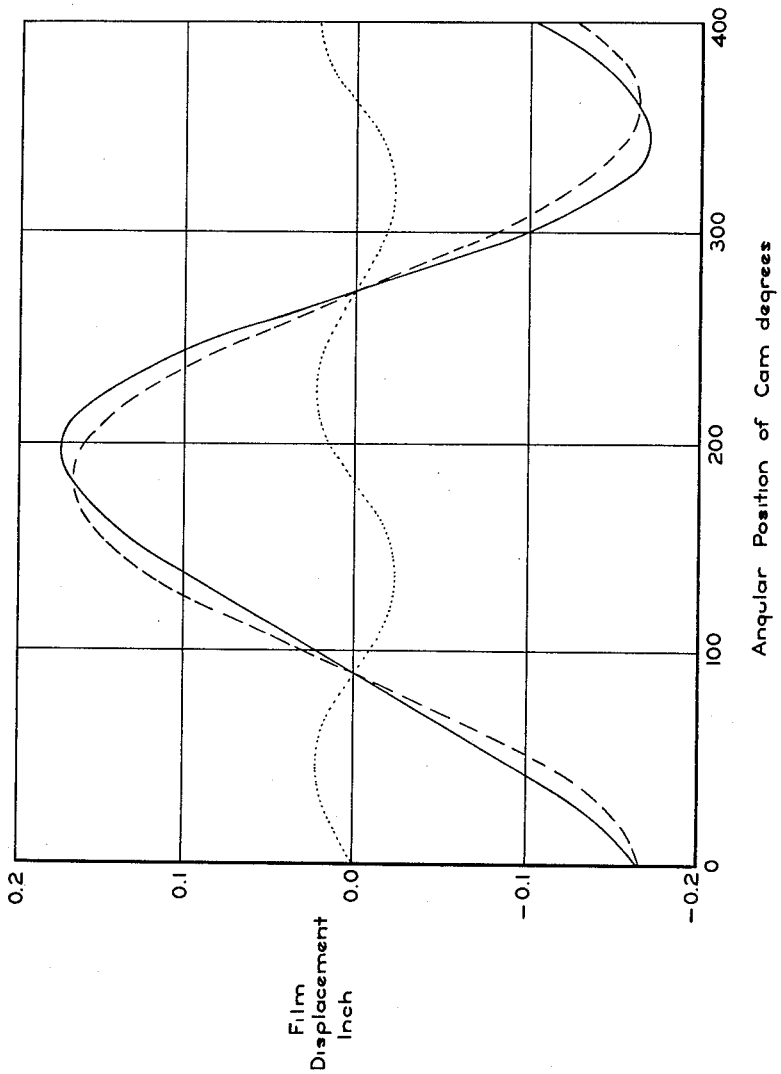
FIG. 4 is a diagram showing the relation between film displacement and angular position for the determination of optimum eccentricity.

Ideally, as indicated in FIG. 4, the plotted curve showing the relationship of the displacement of the film to the portion of the cycle involved should be as nearly as possible a straight line throughout the exposure interval. The nearest possible approach to this condition in the graph of the combination of two sine curves occurs with the fundamental sine curve intersecting the axis of abscissas with a positive slope at the same point that the second harmonic intersects the axis of abscissas with a negative slope, and with the displacement amplitude of the fundamental curve approximately 7¼ times as great as that of the second harmonic. Under these conditions, as the point of intersection with the axis of abscissas is approached from the left, the concave-upward curvature of the fundamental curve is virtually eliminated in the combined curve, by the concave-downward curvature of the second harmonic. Near the point of intersection with the axis of abscissas, the curvature of both the fundamental and the second harmonic reverses. The combined curve, upward toward the right, continues approximately straight.

The period of the fundamental sine function is equal to the period between successive exposures. The amplitude of the functions is such that the film at the exposure gate remains virtually stationary during the exposure. As the fundamental function is produced by the eccentricity and the harmonic is produced by ellipticity, the eccentrics have the speed of 60,000 r.p.m. for operation at 1000 frames per second.

I devised another method for more accurate determination of the optimum dimensions for the elliptical eccentrics. The first step of this method was a mathematical determination of the change in film length produced by an elliptical cam rotating about the intersection of the major and minor axes. The result was considered as an indication of the nature of the second harmonic component present in film motion produced by the rotation of a single pair of elliptical eccentrics. The second step in the analysis was a mathematical determination of the film motion produced by a circular eccentric. This result was considered as an indication of the nature of the fundamental component present in film motion produced by the elliptical eccentric. Upon the results of these two determinations, trial dimensions of an elliptic eccentric was then chosen, to produce the needed ratio of fundamental to second harmonic.

FIG. 4 shows as a solid line the displacement time diagram for the combination of the film motion produced by an elliptical cam rotating about its center and the film motion produced by the circular eccentric. The displacement time diagrams for the film motion produced by an elliptical cam rotating about its center and for the film motion produced by a circular eccentric are represented on FIG. 4 by the dotted line and the dash line respectively.

This study indicated an ellipse having a major axis of 1.594″ and a minor axis of 1.498″ required an eccentricity of 0.1116″ for the best possible image resolution. The theoretical image resolution, according to this determination, is approximately 20 lines per millimeter for the exposure duration of 25% of the total interval between the two successive frames even without the use of the clamp shown in FIGS. 2, 5 and 6.

The clamping mechanism 49 consists of a rotating substantially circular eccentric 51 mounted eccentrically on a shaft 52 and a reciprocating cam follower slide 53 having an elongated opening 54 through which the shaft 52 extends. The slide 53 has its lower end extending into a guide 55 and carries follower rollers 56 and 57 which contact the surface of the circumference of the eccentric 51 at all times respectively above and below the eccentric. At the upper end of the slide 53 is a clamping pad 58 having upwardly extending compressible ribs 61 and 62 which actually clamp the film against the exposure gate across the film's entire width on each side of the exposure gate. The ribs 61 and 62, however, straddle the portion of the film which is being exposed and contact the film across its entire width at the opposite sides of the frame being exposed.

Although cams designed according to the formula set out herein based on the combination of a fundamental sine curve and its second harmonic are preferred by me for the best functioning of devices constructed according to my invention it is obvious that other cams could be designed by empirical methods within the scope of my invention to produce similar results and cyclically lengthen and shorten the respective loops between the input sprocket and the exposure gate and between the exposure gate and the take up sprocket while the film is being fed from the supply roll to the take up roll at a constant rate and thus produce an intermittent movement at the exposure gate in accordance with my invention. Such cams would have to include 3rd, 4th, or 5th harmonics and consequently greater accelerating forces in order to achieve the same 25% of dwell.

*Operation*

A supply of film having been placed on supply roll 16 and threaded over sprocket 17, between rollers 18 and 19, over eccentrics 21 and 22 past exposure gate 13, over eccentrics 24 and 25, between rollers 26 and 27, over sprocket 28 and onto take up roll 23, the driving mechanism is then gradually brought up to speed. The driving mechanism drives in phase with each other sprockets 17 and 28, and cams 21, 22, 24, and 25, and shutter 14. The sprockets 17 and 28 drive the film at constant speed and the length of film between the sprockets 17 and 28 remains constant. However, due to the motion of the eccentrics 21 and 22, the loop between the sprocket 17 and the exposure gate 13 becomes shorter and longer respectively as the loop between the exposure gate 13 and the sprocket 28 becomes respectively longer and shorter. Inasmuch as the amplitude of these increases and decreases corresponds to the speed of the film as driven by the sprockets 17 and 28, the film is quickly moved to a position in which the frame to be exposed is positioned at the exposure gate and the frame is held at this position during a period of approximately 25% of a cycle (i.e. 25% of one revolution of eccentrics 22 and 24). During this time the shutter 14 is opened and the film is exposed to the light rays constituting the image. Immediately thereafter the shutter is closed and the film is moved to the next exposure position, actually moving at the exposure gate faster than the supply from the supply roll 16 and faster than the take up on take up roll 23.

The rollers 18 and 19 and 26 and 27 like the rollers 38, 39, 45 and 46 are not driven, but are free running inertia rollers. As soon as they and the film are brought up to speed by the sprocket wheel drives 17 and 28 they continue by their own inertia (added to that of the film and added to the impetus given to the film by the sprocket wheel drives 17 and 28) to maintain the uniform forward speed of the film at a constant rate. Their contact (unlike that of the sprocket wheel drives) is spread across the whole width of the film and distributes any stresses due to high acceleration and deceleration in the film across the entire width thereof. The cams 21, 22, 24 and 25 also contact the film throughout its entire width. They thus operate to apply accelerating and decelerating force over the whole width of the film. The high reaction of this intermittent force is taken by the inertia rollers 18, 19, 26 and 27 over the whole width of the film and is not appreciably transmitted past the inertia rollers to the sprocket wheel drives 17 and 28. The cams 21, 22, 24 and 25 accelerate and decelerate the loops of film between the inertia rollers 18 and 19 and the exposure gate and between the exposure gate and the inertia rollers 26 and 27. However, they do not directly exert any substantial force (i.e. any force except frictional) in the direction of movement of the film. They do exert force perpendicularly to the direction of movement of the film and thus indirectly accelerate or decelerate the movement of the film at the exposure gate. The force exerted by the cams is in equilibrium with the tension in the film created by the inertia of the inertia rollers 18, 19, 26 and 27.

While the cams 21, 22, 24 and 25 are shown with sleeves 21a, 22a, 24a and 25a, these sleeves may be dispensed with, allowing the film to slide over the smooth surfaces of the cams.

*Operation Second Embodiment*

A supply of film having been placed on the supply roll 36 and threaded over sprocket 37, between inertia rollers 38 and 39, over eccentric 41, past exposure gate 33, over eccentric 47, between inertia rollers 45 and 46, over sprocket 44 and onto take up roll 43, the driving mechanism is gradually brought up to speed. The driving mechanism drives, in phase with each other, sprockets 37 and 44, cams 41 and 47, shutter 34 and clamp 49. The sprockets 37 and 44 drive the film at constant speed and the length of film between the sprockets 37 and 44 remains constant. However, due to the motion of the eccentrics 41 and 47; the loop between the sprocket 37 and the exposure gate 33 becomes shorter and longer respectively as the loop between the exposure gate 33 and the sprocket 44 becomes respectively longer and shorter. For the reason explained in connection with FIGURE 1, the film is quickly moved to a position in which the frame to be exposed is positioned at the exposure gate and is held stationary there during the exposure period which constitutes approximately 25% of the time of one revolution of eccentrics 41 and 47. During the time the film is held stationary at the exposure gate the shutter is opened to expose the portion of the film held at the exposure gate.

At the same time the ribs 61 and 62 of the clamping mechanism are brought into contact with the film across its entire width at spaced lines one on each side of and adjacent to the frame being exposed. The ribs 61 and 62 are compressible so that the film is held securely even at the beginning and end of the stationary period but is held more firmly clamped during the middle of such stationary period. During this time the film between the frames may be compressed slightly by the ribs. After the exposure period, the shutter is closed, the clamp is released and the film in quickly moved to a new position by reason of the lengthening of the loop between the exposure gate 33 and the sprocket 44 and the shortening of the loop between the sprocket 37 and the exposure gate 33.

The film is accelerated gradually by the sprockets 37 and 44 and drives inertia friction rollers 38 and 39 and 45 and 46 and from then on the film and the inertia friction rollers are moved at a constant forward speed. The eccentrics 41 and 47 lengthen and shorten the loops of film on each side of the exposure gate and thus decelerate the film at the exposure gate to a stationary condition and accelerate it to approximately twice the constant forward speed of the film at the inertia rollers 38, 39, 45 and 46, but the force of this acceleration and deceleration is not transmitted appreciably past the inertia rollers to the sprockets 37 and 44. This eliminates tearing or shearing of the film even at the high speeds and accelerations and decelerations used inasmuch as the eccentrics 41 and 47 as well as the inertia rollers 38, 39, 45 and 46 contact with the whole width of the film even though the sprockets 37 and 44 contact it at only a limited width.

FIG. 7 shows the relation between component of displacement at the exposure gate produced by elliptical eccentrics 41 and 47 of FIGURE 2 and angular position of the elliptical eccentrics, as determined from microscopic measurements. The ordinates represent the film displacement in millimeters. The abscissas show the angular position of the cam in degrees. The exposure time was considered as .000250 second which is ¼ of the time of each rotation of the elliptical eccentrics.

It is to be understood that the above described embodiments of my invention are for the purpose of illustration only and various changes may be made therein without departing from the spirit and scope of my invention.

I claim:

1. For a high speed camera comprising a lens, a shutter, an exposure gate, and means for feeding film to and from said exposure gate; the improvement in the means for feeding film which comprises a supply roll for supplying film; a take-up roll for receiving said film after it has been exposed; means for guiding the film from said supply roll past said exposure gate and to said take-up roll; means for feeding said film at a constant rate from said supply roll; means for feeding said film at the same constant rate to said take-up roll; and means comprising a pair of similar sized mathematically elliptical eccentrics each having a major axis and a minor axis which intersect each other at 90° at the center of the ellipse and each having its axis of rotation positioned along a line approximately bisecting the angle between the major and minor axes, said eccentrics being positioned intermediate said supply feeding means and said take-up feeding means for varying the rate of movement of said film at said exposure gate so that the film is substantially stationary at the exposure gate during an exposure interval and is moved past said exposure gate at a rate faster than the constant feeding rate from said supply roll and to said take-up roll during a period between successive exposures, one of said elliptical eccentric cams being positioned intermediate said supply roll and said exposure gate and the other elliptical eccentric cam being positioned intermediate said exposure gate and said take-up roll.

2. For a high speed camera comprising a lens, a shutter, an exposure gate, and means for feeding film to and from said exposure gate, the improvement in the means for feeding film which comprises a supply roll for supplying film; a take-up roll for receiving said film after it has been exposed; means for guiding a first loop of film from said supply roll to said exposure gate; means for guiding a second loop of film from said exposure gate to said take-up roll; means for feeding said film at a constant rate from said supply roll; means for feeding said film at the same constant rate to said take-up roll; means comprising an elliptical eccentric having a major axis and a minor axis positioned at 90° to each other and having its axis of rotation positioned at a point along a line approximately bisecting the angle between the major axis and the minor axis for cyclically increasing and decreasing the length of the first loop; and means comprising a similar size elliptical eccentric having a major axis 90° from its minor axis and having its axis of rotation positioned along a line substantially bisecting the angle between the major axis and the minor axis for cyclically decreasing the length of the second loop as the length of the first loop is increased and for increasing the length of the second loop as the length of the first loop is decreased.

3. For a high speed camera comprising a lens, a shutter, an exposure gate, and means for moving film to and from said exposure gate; the improvement which comprises a supply roll for supplying film; a take-up roll for receiving said film after it has been exposed; means for guiding a first loop of film from said supply roll to said exposure gate; means for guiding a second loop of film from said exposure gate to said take-up roll; means for feeding said film at a constant rate from said supply roll; means for feeding said film at the same constant rate to said take-up roll as the rate of feeding from the supply roll; and means for varying the speed of the film at said exposure gate while maintaining the total length of the film between the supply roll and the take-up roll substantially constant comprising an elliptical eccentric for cyclically increasing and decreasing the length of the first loop, and comprising a similar size elliptical eccentric for cyclically decreasing the length of the second loop correspondingly as the length of the first loop is increased and for increasing the length of the second loop correspondingly as the length of the first loop is decreased; said elliptical eccentrics each having a major axis substantially perpendicular to its minor axis and each having its axis of rotation substantially in a line bisecting the angle between the major and minor axis.

4. For a high speed camera comprising a lens, a shutter, an exposure gate, and means for moving film to and from said exposure gate; the improvement in the means for moving the film which comprises a supply roll for supplying film; a take-up roll for receiving said film after it has been exposed; means for guiding a first loop of film from said supply roll to said exposure gate; means for guiding a second loop of film from said exposure gate to said take-up roll; means for feeding said film at a constant rate from said supply roll; means for feeding said film at the same constant rate to said take-up roll; and means comprising a pair of similar size cams, each cam having an outer surface which is mathematically elliptical, and which has a major axis and a minor axis positioned at 90° to each other, each cam being eccentrically mounted on an axis perpendicular to the plane of the ellipse and intersecting the ellipse in a line which substantially bisects the angle between the major and minor axes of the ellipse and in each cam the relative length of the major and minor axes and the relative length of the major axis and the distance between the center of rotation and the intersection of the major and minor axes are mathematically proportioned to increase at times the length of the loop of film extending from the supply roll to the exposure gate and simultaneously to shorten the length of the loop extending from the exposure gate to the take-up roll according to two sine functions one having twice the frequency of the other and at other times to shorten the length of the loop of film extending between the supply roll and the exposure gate and to increase the length of the loop of film extending between the exposure gate and the take-up roll simultaneously according to said two sine functions one having twice the frequency of the other.

5. For a high speed camera comprising a lens, a shutter, an exposure gate, a film having indentations along its edges, and means for feeding film to and from said exposure gate, the improvement in the means for feeding film which comprises a supply roll for supplying film; a take up roll for receiving said film after it has been exposed; means for guiding a first loop of film from said supply roll to said exposure gate, for decreasing the intermittent strains on the edges of the strip during its passage from said supply reel to said exposure gate, and for cushioning the reactive forces of acceleration and deceleration; means for guiding a second loop of film from said exposure gate to said take up roll, for decreasing the intermittent strains on the edges of the strip during its passage from said exposure gate to said take up roll, and for cushioning the reactive forces of acceleration and deceleration; means for feeding said film at a constant rate from said supply roll comprising a sprocket wheel having sprockets contacting with the perforations formed in said film; means for feeding said film at the same constant rate to said take up roll comprising a sprocket wheel having sprockets cooperating with the perforations in said film; means comprising an elliptical eccentric having a major axis and a minor axis positioned at ninety degrees to each other and having its axis of rotation positioned at a point along a line approximately bisecting the angle between the major axis and the minor axis, and the eccentric itself being positioned to contact said film at a position between said supply roll and said exposure gate for cyclically increasing and decreasing the length of the first loop; and means comprising a similar size elliptical eccentric having a major axis and a minor axis positioned at ninety degrees to each other and having its axis of rotation positioned along a line approximately bisecting the angle between the major axis and the minor axis, and the eccentric itself being positioned to contact said second loop between said exposure gate and said take up roll for cyclically decreasing the length of the second loop as the length of the first loop is increased and for increasing the length of the second loop as the length of the first loop is decreased; said first named means for guiding the first loop of film from said supply roll to said exposure gate and for cushioning the reactive forces of acceleration and deceleration and for decreasing the intermittent strains on the edges of the strip during its passage from the supply roll to the exposure gate comprising a pair of relatively heavy rollers one placed on one side of said strip and contacting the strip and the other placed on the opposite side of said strip and contacting the strip directly opposite the first named roller, so that the strip is held firmly between the two rollers and the two rollers contact the strip throughout its width; and said means for guiding the second loop of film from the exposure gate to the take up roll and for cushioning the reactive forces of acceleration and deceleration and for decreasing the intermittent strains on the edges of the strip during its passage from the exposure gate to the take up roll comprising a pair of relatively heavy inertia rollers positioned to contact said film between them, one of said rollers of said pair being placed on one side of said strip and the other roller of said pair being placed on the opposite side of said strip directly opposite to the first named roller so that the strip is held firmly between the two rollers and the two rollers contact the strip throughout its width.

6. For a high speed camera comprising a lens, a shutter, an exposure gate, a film, and means for feeding film to and from said exposure gate, the improvement in the means for feeding film which comprises a supply roll for supplying film; a take up roll for receiving said film after it has been exposed; means for guiding a first loop of film from said supply roll to said exposure gate, and for decreasing the intermittent strains on the strip during its passage from said supply reel to said exposure gate; means for guiding a second loop of film from said exposure gate to said take up roll, and for decreasing the intermittent strains on the strip during its passage from said exposure gate to said take up roll; means for feeding said film at a constant rate from said supply roll; means for feeding said film at the same constant rate to said take up roll; means comprising an elliptical eccentric having a major axis and a minor axis positioned at ninety degrees to each other and having its axis of rotation positioned at a point along a line approximately bisecting the angle between the major axis and the minor axis, and the eccentric itself being positioned to contact said film at a position between said supply roll and said exposure gate for cyclically increasing and decreasing the length of the first loop; and means comprising a similar size elliptical eccentric having a major axis and a minor axis positioned at ninety degrees to each other, and having its axis of rotation positioned along a line approximately bisecting the angle between the major axis and the minor axis, and the eccentric itself being positioned to contact said second loop between said exposure gate and said take up roll for cyclically decreasing the length of the second loop as the length of the first loop is increased and for increasing the length of the second loop as the length of the first loop is decreased; said first named means for guiding the first loop of film from said supply roll to said exposure gate and for decreasing the intermittent strains on the edges of the strip during its passage from the supply roll to the exposure gate comprising a pair of relatively heavy rollers one placed on one side of said strip and contacting the strip and the other placed on the opposite side of said strip and contacting the strip directly opposite the first named roller, so that the strip is held firmly between the two rollers and the two rollers contact the strip throughout its width; and said means for guiding the second loop of film from the exposure gate to the take up roll and for decreasing the intermittent strains on the edges of the strip during its passage from the exposure gate to the take up roll comprising a pair of relatively heavy inertia rollers positioned to contact said film between them, one of said rollers of said pair being placed on one side of said strip and the other roller of said pair being placed on the opposite side of said strip directly opposite to the first named roller so that the strip is held firmly between the two rollers and the two rollers contact the strip throughout its width.

7. For a high speed camera comprising a lens, a shutter, an exposure gate, a film having indentations along its edges, and means for feeding film to and from said exposure gate, the improvement in the means for feeding film which comprises a supply roll for supplying film; a take up roll for receiving said film after it has been exposed; means for guiding a first loop of film from said supply roll to said exposure gate; means for guiding a second loop of film from said exposure gate to said take up roll; means for feeding said film at a constant rate from said supply roll; means for feeding said film at the same constant rate to said take up roll; means comprising an elliptical eccentric having a major axis and a minor axis positioned at ninety degrees to each other and having its axis of rotation positioned at a point along a line approximately bisecting the angle between the major axis and the minor axis and the eccentric itself being positioned to contact said film at a position between said supply roll and said exposure gate for cyclically increasing and decreasing the length of the first loop; means comprising a similar size elliptical eccentric having a major axis and a minor axis positioned at ninety degrees to each other and having its axis of rotation positioned along a line approximately bisecting the angle between the major axis and the minor axis and the eccentric itself being positioned to contact said second loop between said exposure gate and said take up roll for cyclically decreasing the length of the second loop as the length of the first loop is increased and for increasing the length of the second loop as the length of the first loop is decreased; and means comprising a clamp positioned at the exposure gate for holding the film stationary during the exposure interval.

References Cited in the file of this patent

UNITED STATES PATENTS

| | | |
|---|---|---|
| 673,992 | Armat | May 14, 1901 |
| 1,010,370 | Jenkins | Nov. 28, 1911 |
| 2,021,560 | Lira | Nov. 19, 1935 |
| 2,039,906 | Howell | May 5, 1936 |
| 2,249,167 | Parker | July 15, 1941 |
| 2,618,196 | Mitchell | Nov. 18, 1952 |
| 2,762,255 | Anderson | Sept. 11, 1956 |
| 2,772,941 | Hulcher | Dec. 4, 1956 |

FOREIGN PATENTS

| | | |
|---|---|---|
| 271,990 | Italy | Feb. 25, 1930 |
| 165,869 | Australia | Nov. 3, 1955 |

UNITED STATES PATENT OFFICE
CERTIFICATE OF CORRECTION

Patent No. 3,044,677                                July 17, 1962

Carl David Miller

It is hereby certified that error appears in the above numbered patent requiring correction and that the said Letters Patent should read as corrected below.

Column 3, line 67, for "eccentric" read -- eccentrics --; line 73, for "or" read -- for --; column 9, line 9, for "in" read -- is --.

Signed and sealed this 26th day of February 1963.

(SEAL)
Attest:

ESTON G. JOHNSON
Attesting Officer

DAVID L. LADD
Commissioner of Patents